United States Patent
Armangau et al.

(10) Patent No.: US 8,442,952 B1
(45) Date of Patent: May 14, 2013

(54) RECOVERING IN DEDUPLICATION SYSTEMS

(75) Inventors: Philippe Armangau, Acton, MA (US); Sorin Faibish, Newton, MA (US); Christopher A. Seibel, Walpole, MA (US); John F. Gillono, Chelmsford, MA (US); Srinivasa R. Vempati, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/075,661

(22) Filed: Mar. 30, 2011

(51) Int. Cl.
*G06F 17/00* (2006.01)

(52) U.S. Cl.
USPC ............. 707/686; 707/610; 707/674; 706/14; 706/45

(58) Field of Classification Search .................. None
See application file for complete search history.

(56) References Cited

U.S. PATENT DOCUMENTS

| | | | |
|---|---|---|---|
| 7,567,188 B1* | 7/2009 | Anglin et al. | 341/63 |
| 7,930,275 B2* | 4/2011 | Chen et al. | 707/674 |
| 2006/0089953 A1* | 4/2006 | Chen et al. | 707/202 |
| 2009/0234892 A1* | 9/2009 | Anglin et al. | 707/201 |
| 2010/0070478 A1* | 3/2010 | Anglin | 707/674 |
| 2010/0070704 A1* | 3/2010 | Jibbe et al. | 711/114 |
| 2011/0099351 A1* | 4/2011 | Condict | 711/216 |
| 2011/0246430 A1* | 10/2011 | Prahlad et al. | 707/679 |
| 2012/0084261 A1* | 4/2012 | Parab | 707/654 |
| 2012/0221529 A1* | 8/2012 | Rosikiewicz et al. | 707/679 |

* cited by examiner

*Primary Examiner* — Hung Le
(74) *Attorney, Agent, or Firm* — Krishnendu Gupta; Jason A. Reyes; Deepika Bhayana

(57) ABSTRACT

A method is used in recovering in deduplication systems. Metadata of a data object is evaluated for determining deduplication status for the data object. Based on the deduplication status, the data object is recovered.

20 Claims, 20 Drawing Sheets

RECOVERING IN DEDUPLICATION SYSTEMS

BACKGROUND

1. Technical Field

This application relates to recovering in deduplication systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

The accuracy and consistency of a file system is necessary to relate applications and data used by those applications. However, there may exist the potential for data corruption in any computer system and therefore measures are taken to periodically ensure that the file system is consistent and accurate. In a data storage system, hundreds of files may be created, modified, and deleted on a regular basis. Each time a file is modified, the data storage system performs a series of file system updates. These updates, when written to a disk storage reliably, yield a consistent file system. However, a file system can develop inconsistencies in several ways. Problems may result from an unclean shutdown, if a system is shut down improperly, or when a mounted file system is taken offline improperly. Inconsistencies can also result from defective hardware or hardware failures. Additionally, inconsistencies can also result from software errors or user errors.

Additionally, the need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

A file system checking (FSCK) utility provides a mechanism to help detect and fix inconsistencies in a file system. The FSCK utility verifies the integrity of the file system and optionally repairs the file system. In general, the primary function of the FSCK utility is to help maintain the integrity of the file system. The FSCK utility verifies the metadata of a file system, recovers inconsistent metadata to a consistent state and thus restores the integrity of the file system. To verify the metadata of a file system, the FSCK utility traverses the metadata of the file system and gathers information, such as status and bitmaps for the traversed metadata. The FSCK utility stores the gathered information in a memory of the data storage system. The FSCK utility then validates the correctness of the metadata using the information stored in the memory.

File systems typically include metadata describing attributes of a file system and data from a user of the file system. A file system contains a range of file system blocks that store metadata and data. A user of a filesystem access the filesystem using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be as many as five levels of indirect blocks arranged in an hierarchy depending upon the size of a file where each level of indirect blocks includes pointers to indirect blocks at the next lower level. An indirect block at the lowest level of the hierarchy is known as a leaf indirect block.

A file may be replicated by using a snapshot copy facility that creates one or more replicas (also referred to as "snapshot copies") of the file. A replica of a file is a point-in-time copy of the file. Further, each replica of a file is represented by a version file that includes an inheritance mechanism enabling metadata (e.g., indirect blocks) and data (e.g., direct data blocks) of the file to be shared across one or more versions of the file. Snapshot copies are in widespread use for on-line data backup. If a file becomes corrupted, the file is restored with its most recent snapshot copy that has not been corrupted.

A file system based snapshot copy facility is described in Bixby et al. U.S. Patent Application Publication 2005/0065986 published Mar. 24, 2005, incorporated herein by reference. When a snapshot copy of a file is initially created, it includes only a copy of the file. Therefore the snapshot copy initially shares all of the data blocks as well as any indirect blocks of the file. When the file is modified, new blocks are allocated and linked to the file to save the new data, and the original data blocks are retained and linked to the inode of the snapshot copy. The result is that disk space is saved by only saving the difference between two consecutive versions of the file.

Deduplication is a space-saving technology intended to eliminate redundant (duplicate) data (such as, files) on a data storage system. By saving only one instance of a file, disk space can be significantly reduced. For example, if a file of size 10 megabytes (MB) is stored in ten folders of each employee in an organization that has ten employees. Thus, 100 megabytes (MB) of the disk space is consumed to maintain the same file of size 10 megabytes (MB). Deduplication ensures that only one complete copy is saved to a disk. Subsequent copies of the file are only saved as references that point to the saved copy, such that end-users still see their own files in their respective folders. Similarly, a storage system may retain 200 e-mails, each with an attachment of size 1 megabyte (MB). With deduplication, the disk space needed to store each attachment of size 1 megabyte (MB) is reduced to just 1 megabyte (MB) from 200 megabyte (MB) because deduplication only stores one copy of the attachment.

Data deduplication can operate at a file or a block level. File deduplication eliminates duplicate files (as in the example above), but block deduplication processes blocks within a file and saves unique copy of each block. For example, if only a few bytes of a document or presentation or a file are changed, only the changed blocks are saved. The changes made to few bytes of the document or the presentation or the file do not constitute an entirely new file.

The sharing of file system data blocks conserves data storage for storing files in a data storage system. The snapshot copy facility is a space saving technology that enables sharing of file system data blocks among versions of a file. On the other hand, a deduplication facility enables the sharing of file system data blocks within a file, among versions of a file, between versions of a file and unrelated files, and among unrelated files. Therefore, the deduplication facility eliminates from the data storage system any file system data blocks containing duplicative data content.

While deduplication systems have helped make data management much easier, they also come with a number of challenges, especially when recovering data. It may be difficult or impossible for the FSCK utility to recover a deduplicated file system that may further be replicated by the snapshot facility.

SUMMARY OF THE INVENTION

A method is used in recovering in deduplication systems. Metadata of a data object is evaluated for determining deduplication status for the data object. Based on the deduplication status, the data object is recovered.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
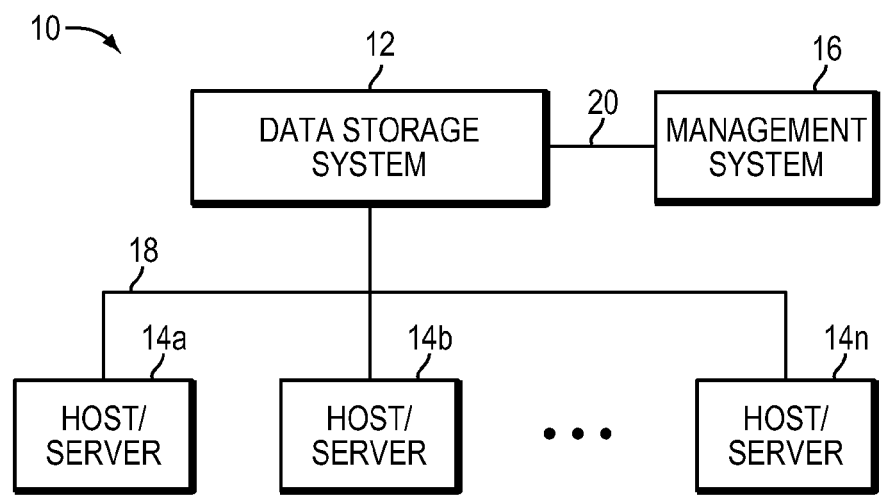
FIG. 1 is an example of an embodiment of a computer system that may utilize the techniques described herein.

Described below is a technique for use in recovering in deduplication systems (i.e., data deduplication systems), which technique may be used to provide, among other things, evaluating metadata of a data object for determining deduplication status for the data object and recovering the data object based on the deduplication status.

Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over set of data blocks in one or more storage extents, finding the blocks that contain identical information by processing digest information associated with each block and mapping the identical blocks to a single copy of the data. In such systems, an index table of unique digests is created to find commonality among the data set. When a deduplicated data block is updated with a new content, a new data block is created containing the new updated content. Mapping of the deduplicated block is then changed to point to the new data block and the deduplicated block no longer points to the single copy of the data. This process is referred to as reduplication.

In at least one storage system implementation as described below, recovering a data block in deduplication systems includes updating deduplication status of the data block when the data block is either deduplicated or reduplicated, and recovering the data block based on the deduplication status of the data block.

Conventionally, the FSCK utility for feature software recovers a data block shared between a file and a replica of the file by using the logical offset (e.g., logical block number) of the data block. In such a conventional system, when a data block is shared between a file and a replica of the file, the data block has the same logical offset whether the data block is accessed from the file or the replica of the file. In such a conventional system, the FSCK utility may successfully recover the data block because a replica of the file share the data block at the same logical offset, thus the FSCK utility does not create a metadata inconsistency when the shared data block is recovered using the logical offset of the data block. However, in such a conventional system, a data block of a file may be deduplicated to another data block associated to an unrelated file. In such a conventional system, the logical offset of the data block of the file may be different from the logical offset of the deduplicated data block associated to the unrelated file. Therefore, in such a conventional system, the FSCK utility can not recover the deduplicated data block using the logical offset of the deduplicated data block because the deduplicated data block may be accessed by two different logical offsets. As a result, in such a conventional system, a user may lose data if the FSCK utility is unable to recover the deduplicated data block. Thus, in such a conventional system, even if a portion of a filesystem is deduplicated, the FSCK utility may not be able to recover the entire file system at all because the FSCK utility does not have information regarding which data block of the file system is deduplicated. For example, in such a conventional system, if an indirect block of a file includes 1024 block pointers to data blocks and each data block stores 8 kilobyte of data, a user may lose up to 8 megabyte of data, if the FSCK utility is unable to recover one indirect block which may have one or more deduplicated data blocks.

By contrast, in at least some implementations in accordance with the technique as described herein, the use of the recovering in deduplication systems technique can provide one or more of the following advantages: reducing or eliminating data loss by enabling the FSCK utility to recover a deduplicated file system, simplifying processing of the FSCK utility by updating the deduplication status of a data block and checking the deduplication status of the data block, and lowering storage cost by removing or reducing the need to create duplicate copies of metadata for recovering a data block.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

Figure 2A:
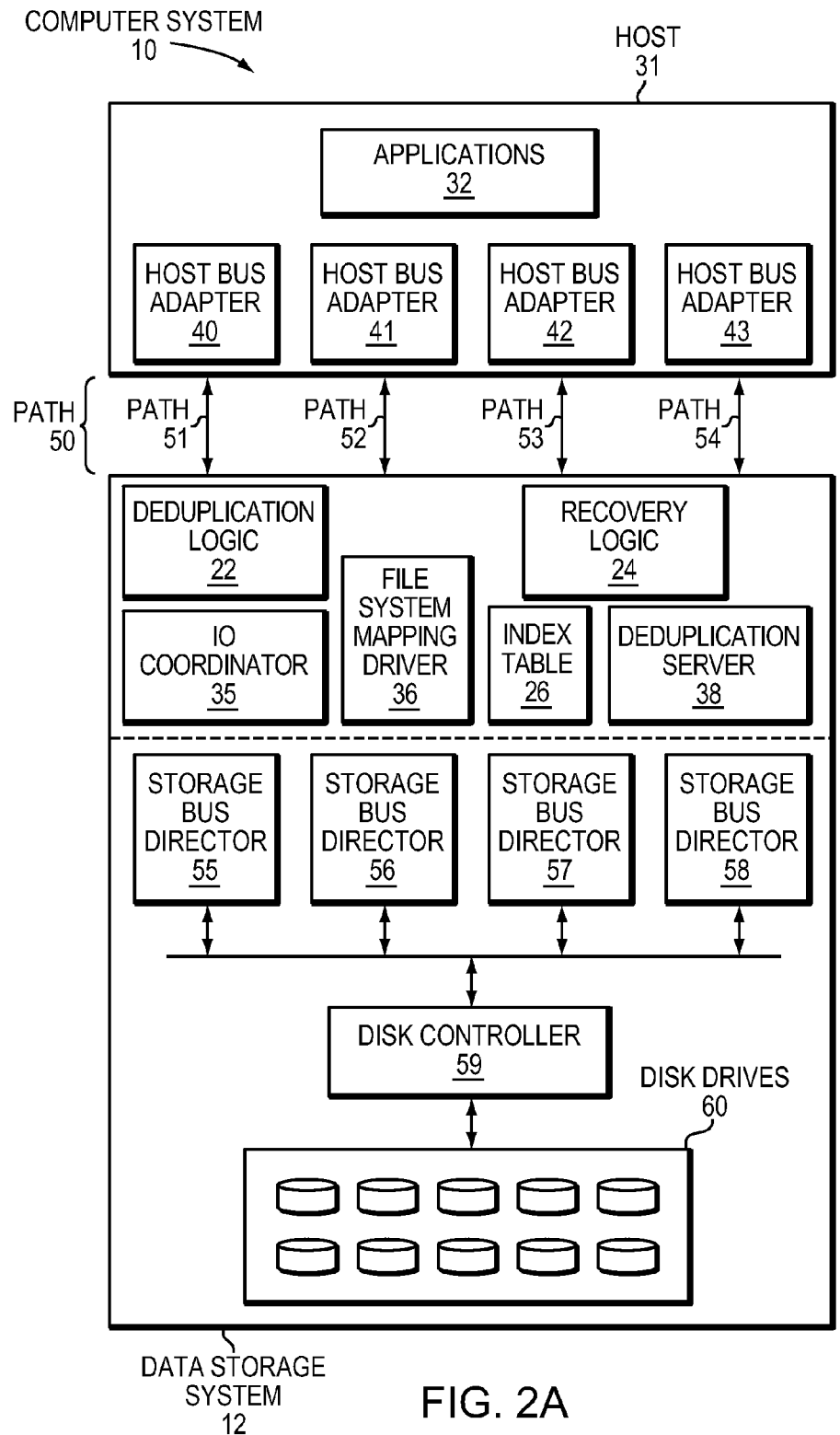
FIGS. 2A and 2B are examples of an embodiment of a computer system that may utilize the techniques described herein.
Figure 2B:
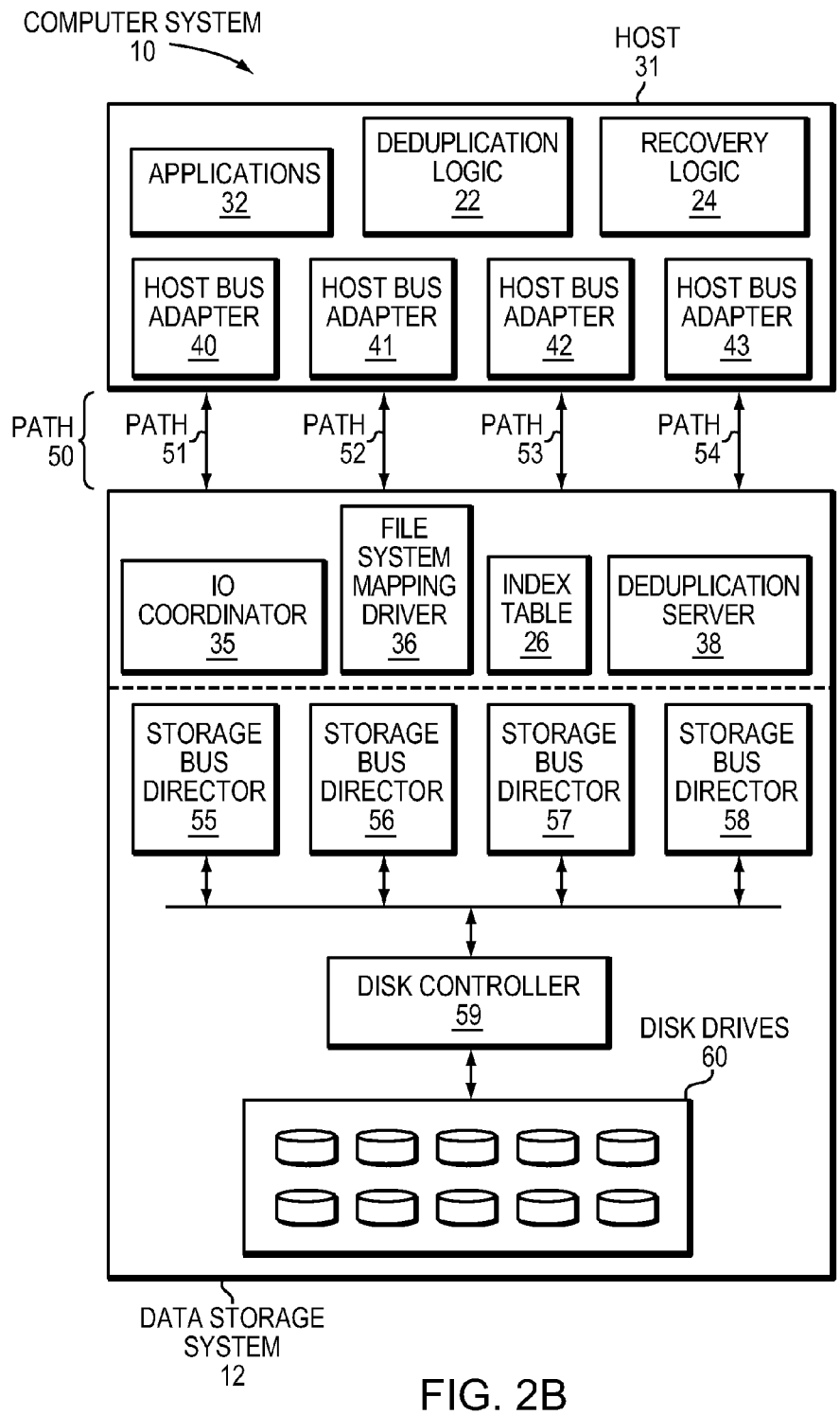

Referring to FIGS. 2A and 2B, shown is a more detailed example of an embodiment of a computer system that may be used in connection with performing the techniques described herein. A computer system 10 may include multiple hosts and multiple data storage systems in such a way that each host may access data on each of data storage systems. For simplicity, however, FIG. 2A and FIG. 2B illustrate a computer system 10 that includes a single host 31 and a single data storage system 12. Applications 32 running on an operating system of host 31 may access data in data storage system 12 via I/O driver and host bus adapters 40, 41, 42, and 43. Host 31 can be, for example, a server, a personal computer, or any other device capable of initiating read and write requests to data storage system 12. Host 31 has multiple paths 50 for sending I/O requests to data storage system 12. Typically, there are at least two paths from a host to a data storage system. FIGS. 2A and 2B show four paths from host 31 to data storage system 12: path 51, path 52, path 53, and path 54. Each of the paths 50 can be any of a number of different types of communication links that allow data to be passed between data storage system 12 and host 31. Each of the host bus adapters 40, 41, 42, and 43 would be adapted to communicate using an appropriate protocol via the paths 50 with the storage bus directors 55, 56, 57 and 58. For example, path 50 can be implemented as a SCSI bus with host bus adapters 40 and storage bus director 55 each being a SCSI driver. Alternatively, path 50 between the host 31 and the data storage subsystem 12 may be a Fibre Channel fabric. Moreover, a path 50 may include multiple communication path types and may be part of a communication network. Storage bus directors 55, 56, 57 and 58 further communicates with the disk controller 59 to access data stored on the disk drives 60. The disk controller 59 may be configured to perform data storage operations on behalf of the host 31.

In at least one embodiment of the current technique, deduplication logic 22 and recovery logic 24 can be provided on data storage system 12 as shown in FIG. 2A. In an alternative embodiment, deduplication logic 22 and recovery logic 24 may be provided also or instead on a host system, such as host system 31 as shown in FIG. 2B. As described elsewhere herein, recovery logic 24 may be performed in a manner that is transparent to an application running on a host system. In at least one embodiment of the current technique, deduplication server 38 provides deduplication services in data storage system 12 by working in conjunction with I/O Coordinator 35 and File System Mapping Driver 36. IO Coordinator 35 manages I/O operations in conjunction with the file system mapping driver 36. IO Coordinator 35 provides framework for implementing digest and other I/O requests issued by the deduplication server 38. File system mapping driver 36 is a light-weight file system library that provides a file system functionality and allows data storage system 12 to create files within a file system. File system mapping driver 36 processes I/Os directed to metadata of a file system and provides information regarding metadata (e.g., deduplication key) of a data block that is potentially a candidate for deduplication.

Figure 3:
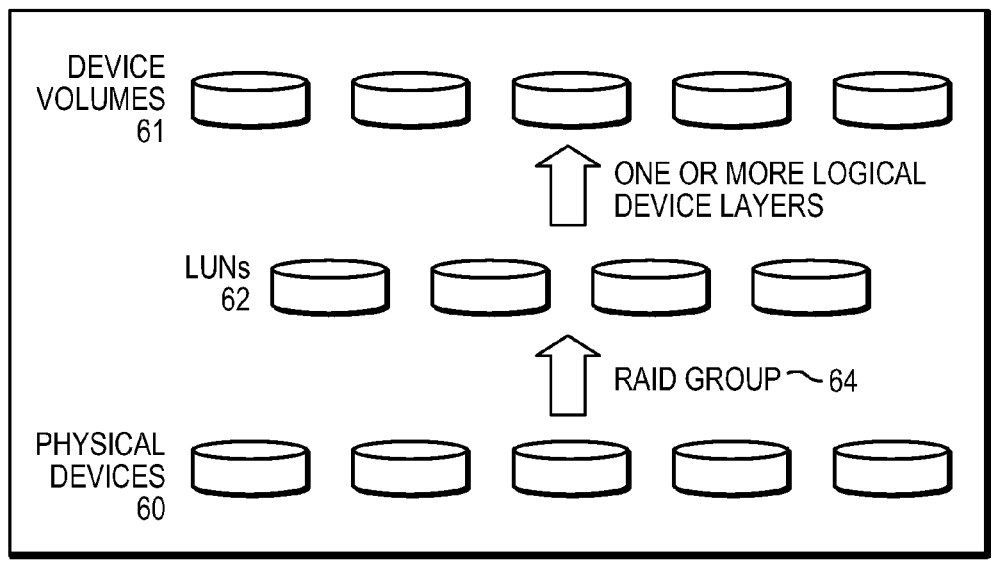
FIG. 3 is an example illustrating storage device layout.

FIG. 3 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62. Thus, a deduplication domain consisting of a set of storage extents includes a set of deduplicated LUNs sharing a common set of blocks.

Figure 4:
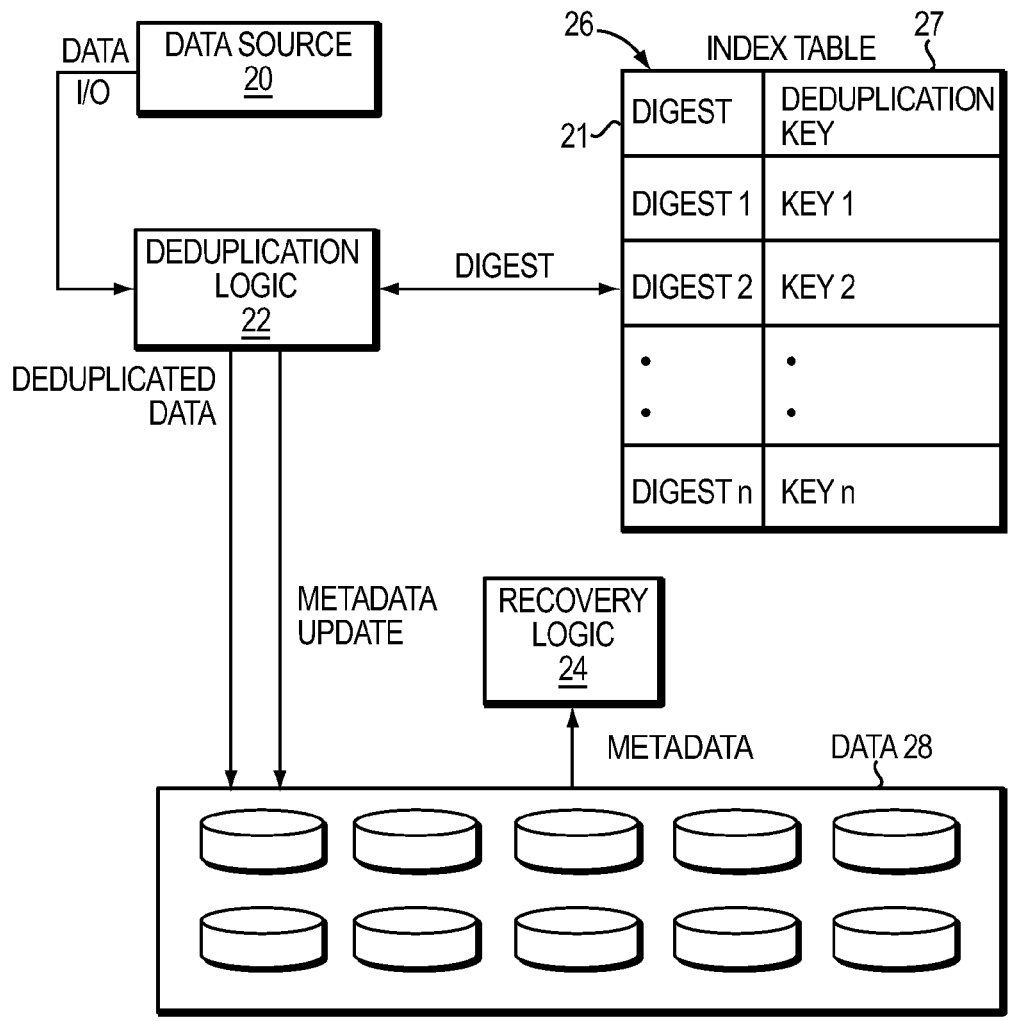
FIGS. 4-18 are diagrams illustrating in more detail components that may be used in connection with techniques herein.

Referring to FIG. 4, shown is a more detailed representation of components that may be included in an embodiment using the techniques herein. The system described herein may provide recovery in deduplication systems for data stored on any type of storage medium or device, including disk storage. In at least some implementations, an index table is a persistent hash-table of chunk-IDs keyed either by the digest of the data stored in the chunk or by the deduplication key of the data stored in the chunk. The index table need not contain entries for every data chunk in the deduplication domain, but the effectiveness of deduplication is a function of the number of entries stored in the index table 26. Deduplication of data happens in two logically distinct operations: detection and remapping. The detection operation identifies blocks containing the same data. The remapping operation updates address maps that record physical locations of logical units of data so that a single block of data is shared by multiple LUNs or by multiple positions within the same LUN. Detection is accomplished by building a database (e.g., index table 26) that maintains a digest 21 (e.g., SHA, checksum) and, a deduplication key 27 for each data block. When two data blocks have the same digest they have a sufficiently high probability of containing the same data to warrant a bit-for-bit comparison to confirm they are exact duplicates. Remapping leverages dynamic block-mapping technology of filesystem mapping driver 36. A filesystem allows dynamic manipulation of the address maps that connects LUN's logical address space to its physical address space.

In at least one embodiment of the current technique, data source 20 can be, for example, a server, a personal computer, a client workstation, or any other device capable of initiating data I/O requests (e.g. read and/or write requests) to data 28 stored on a storage medium (e.g. disk storage). Deduplication logic 22 module deduplicates data 28 that is accessed by data source 20. A goal of deduplication logic 22 is to maintain only a single copy of each unique set of data within data set 28. To achieve that goal, deduplication logic 22 finds data blocks that have not been deduplicated and processes data blocks for deduplication by computing digests for data blocks. A digest is a representation of contents stored in a data block. Further, the digest is mathematically computed (e.g., MD5, SHA-1, SHA-2) in such a way that, computationally, there is a very low or zero probability of finding two data blocks that have the same digest but different contents. If the digest for the data block is sent together with the data block, a recipient of the data block can compute a new digest from the received data block and can compare the new digest with the received digest to determine whether the received data block is valid. Additionally, a digest is stored in an index table 26 in order to process data blocks within data set 28 for deduplication. Further, a deduplication key identifying a data block is also stored in index table 26 along with the digest for the data block. A deduplication key uniquely identifies a data block by storing information (such as logical address, physical address) of the data block. Deduplication logic 22 identifies data blocks that can potentially be deduplicated by comparing digests of data blocks with list of digests stored in index table 26. Further, when data blocks are deduplicated after comparing digest information, deduplication logic 22 updates metadata of deduplicated data blocks. Additionally, deduplication logic 22 updates metadata of a data block when the data block is reduplicated. Recovery logic 24 checks metadata of a data block to verify whether the data block has been deduplicated. If metadata of the data block indicates that the data block has been deduplicated, recovery logic 24 does not recover the data block and, if metadata of the data block indicates that the data block has not been deduplicated, recovery logic 24 recovers the data block. In one embodiment of the current invention, recovery logic 24 may include a FSCK utility. In at least some implementations in accordance with the technique as described herein, recovery logic 24 may recover a deduplicated file system by selectively recovering data blocks that are not deduplicated. Thus, in at least some embodiments of the current technique, the FSCK utility may recover a portion of a deduplicated file system by recovering the data blocks that are not deduplicated. For example, if 20% of data within data set 28 is deduplicated, recovery logic 24 may recover 80% of data within data set 28 that is not deduplicated.

Figure 5:
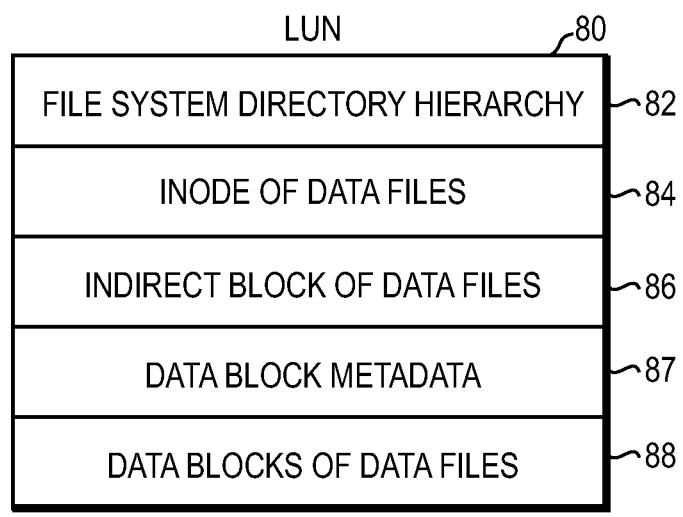

Referring to FIG. 5, shown is a logical representation of a LUN presented organized as a file system that may be included in an embodiment using the techniques herein. A user of data storage system 12 access data from LUNs stored on disk drives 60 in fixed sized chunks. Each fixed size chunk is known as a slice. One or more slices are grouped together to create a slice pool. Host system 31 provisions storage from slice pools for creating LUNs. A LUN 80 is visible to host system 31 and a user of a data storage system 12. Typically, storage is allocated when host system 31 issues a write request and needs a data block to write user's data. File systems typically include metadata describing attributes of a file system and data from a user of the file system. A file system contains a range of file system blocks that store metadata and data. File system mapping driver 36 allocates file system blocks from slices of storage for creating files and storing metadata of a file system. In at least some embodiments of the current technique, the file system block may be 8 kilobyte (KB) in size. Further, a user of data storage system 12 creates files in a file system. The file system is organized as a hierarchy. At the top of the hierarchy is a hierarchy of the directories 82 in the file system. Inodes of data files 84 depend from the file system directory hierarchy 82. Indirect blocks of data files 86 depend from the inodes of the data files 84. Data block metadata 87 and data blocks of data files 88 depend from the inodes of data files 84 and from the indirect blocks of data files 86.

A file system includes one or more file system blocks. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. There are at least fifteen block pointer entries in a block pointer array contained in an inode of a file. The first of up to twelve entries of block pointers in the inode directly point to the first of up to twelve data blocks of the file. If the file contains more than twelve data blocks, then the thirteenth entry of the block pointer array contains an indirect block pointer pointing to an indirect block containing pointers to one or more additional data blocks. If the file contains so many data blocks that the indirect block becomes full of block pointers, then the fourteenth entry of the block pointer array contains a double indirect block pointer to an indirect block that itself points to an indirect block that points to one or more additional data blocks. If the file is so large that the indirect block becomes full of block pointers and its descendant indirect blocks are also full of block pointers, then the fifteenth entry of the block pointer array includes another level of indirection where the block pointer entry contains a triple indirect block pointer to an indirect block that points to an indirect block that points to an indirect block that points to one or more additional data blocks. Similarly there exists fourth and fifth level of indirections. Once the indirect blocks at last level of indirection and its descendant indirect blocks become full of pointers, the file contains a maximum permitted number of data blocks. Further, an indirect block at the last level of indirection is also referred to as a leaf indirect block.

Figure 6:
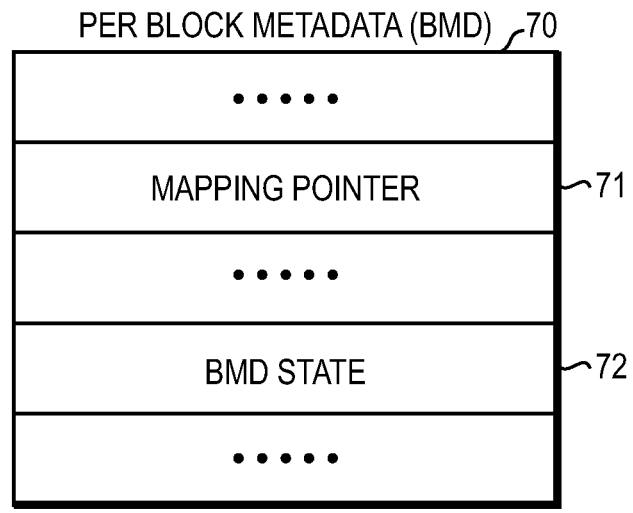

Referring to FIG. 6, shown is a representation of a per block metadata (also referred to as "BMD") for a file system data block that may be included in an embodiment using the techniques described herein. The per-block metadata 70 for a file system data block includes an inode number of a file of the file system, the file system data block number and the logical offset of the file system data block. The per-block metadata 70 for a file system data block also includes an internal checksum protecting the integrity of the information stored in the per-block metadata 70. The per-block metadata for a file system data block may further include a mapping pointer 71 and a data structure indicating state of the per-block metadata 72.

Figure 7:
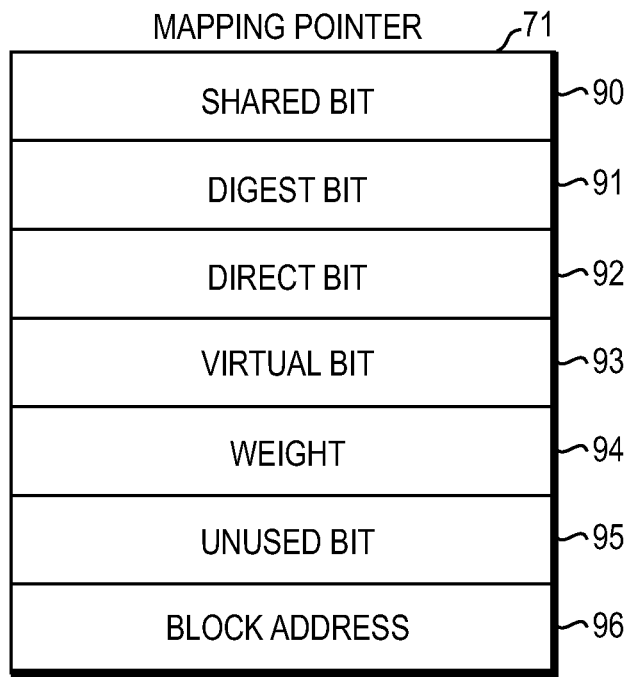

Referring to FIG. 7, shown is a representation of a mapping pointer 71 of a file system data block that may be included in an embodiment using the techniques described herein. Each file system data block of a file is associated with a respective mapping pointer. A mapping pointer of a file system block points to the file system block and includes metadata information for the file system block. A file system block associated with a mapping pointer may be a data block or an indirect data block which in turn points to other data blocks or indirect blocks. A mapping pointer includes information that help map a logical offset of a file system block to a corresponding physical block address of the file system block. Mapping pointer 71 includes metadata information such as shared bit 90, digest bit 91, direct bit 92, virtual bit 93, weight 94, unused bit 95 and block address 96. Shared bit 90 of mapping pointer 71 associated with a file system data block indicates whether the data block (or data blocks if the mapping pointer is associated with an indirect block) may be shared. Digest bit 91 of mapping pointer 71 for a file system block indicates whether the file system block has been digested by deduplication logic 22. Digest Bit 91 is updated when the data block is modified and thus reduplicated. Updating the digest bit 91 includes clearing (also referred to as "resetting") the value stored in the digest bit 91. In at least one embodiment, clearing digest bit 91 includes storing the value zero in the digest bit 91. Direct bit 92 of mapping pointer 71 for a file system block indicates whether the physical address of the file system block can be computed algorithmically. Virtual bit 93 of mapping pointer 71 for a file system block indicates whether the mapping pointer is a virtual pointer. Weight 94 of mapping pointer 71 for a file system block indicates a delegated reference count for the mapping pointer 71. The delegated reference count is used by the snapshot copy facility when a replica of a file is created. Mapping pointers of the inode of the file are copied and included in the inode of the replica of the file. In at least one embodiment, mapping pointers of the inode may include mapping pointers pointing to direct data blocks and mapping pointers pointing to indirect data blocks. Then, the delegated reference count values stored in the mapping pointers of the file and the replica of the file are updated to indicate that the file and the replica of the file share data blocks of the file. Unused bit 95 of mapping pointer 71 for a file system block indicates an unused space reserved for a future use. Block address 96 of mapping pointer 71 for a file system block indicates the block number of the file system block.

Figure 8:
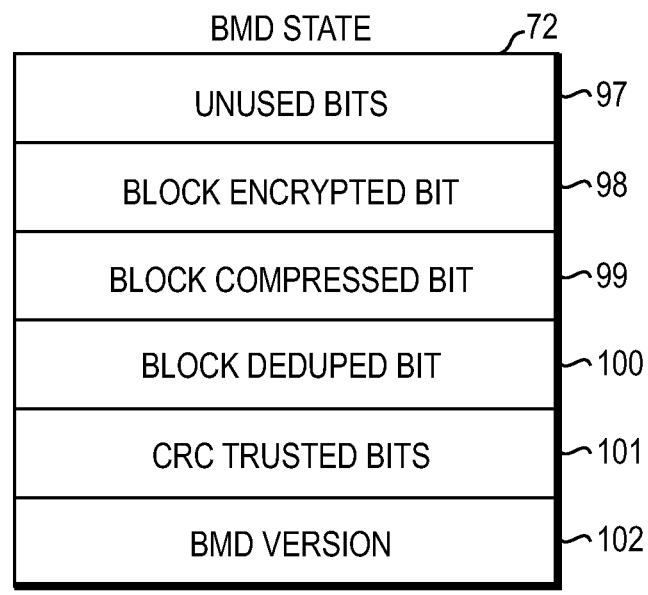

Referring to FIG. 8, shown is a representation of a BMD state included in the per-block metadata 71 of a file system block that may be included in an embodiment using the techniques described herein. BMD state 72 included in per-block metadata 71 of a file system block may include unused bits 97, block encrypted bit 98, block compressed bit 99, block deduped bit 100, CRC trusted bits 101, and BMD version 102. Unused bits 97 indicates an unused space reserved for a future use. Block encrypted bit 98 indicates whether the file system block mapped by the mapping pointer 71 has been encrypted. Block compressed bit 99 indicates whether the file system block mapped by the mapping pointer 71 has been compressed. Block deduped bit 100 indicates whether the file system block mapped by the mapping pointer 71 has been deduplicated. BMD version 102 indicates a version of the data structure associated with per-block metadata 70.

In at least some implementations in accordance with the current technique, block deduped bit 100 indicates to the FSCK utility whether the data block mapped by mapping pointer 70 has been deduplicated. The FSCK utility uses this information to determine whether the data block may be recovered. Block deduped bit 100 is updated whenever the data block associated with mapping pointer 70 is either deduplicated or reduplicated. When block deduped bit 100 for a data block is not set, the data block may be shared only among versions of a file and thus can be recovered by the FSCK utility using block address 96 stored in mapping pointer 71.

As introduced above herein, the file-system based snapshot copy facility needs a way of maintaining block ownership information for indicating whether or not each indirect block or data block of a file or a snapshot copy (or "replica") of the file is shared with another version of the file. This block ownership information is accessed each time that the snapshot copy facility writes new data to a file, and each time that the snapshot copy facility deletes a snapshot copy. Further, as introduced above, files in the data storage system 12 are organized as a hierarchy of file system blocks including inodes, indirect blocks, and data blocks. The hierarchy of file system blocks includes a parent-child block relationship between a parent object that points to a child object. For example, if the mapping pointer of the inode of a file points to a data block, the association between the mapping pointer of the inode and the data block may be viewed as a parent-child block relationship. Similarly, for example, if the mapping pointer of an indirect block of a file points to a data block, the association between the mapping pointer of the indirect block and the data block may be viewed as a parent-child block relationship. Block ownership information for a snapshot copy facility is maintained by storing respective reference counts for the file system indirect blocks and file system data blocks in the file system block hierarchy, and by storing respective delegated reference counts for the parent-child block relationships in the file system block hierarchy. For each parent-child block relationship, a comparison of the respective delegated reference count for the parent-child relationship to the reference count for the child block indicates whether or not the child block is either shared among parent blocks or has a single, exclusive parent block. For example, if the respective delegated reference count is equal to the respective reference count, then the child block is not shared, and the parent block is the exclusive parent of the child block. Otherwise, if the respective delegated reference count is not equal to the respective reference count, then the child block is shared among parent blocks.

Figure 9:
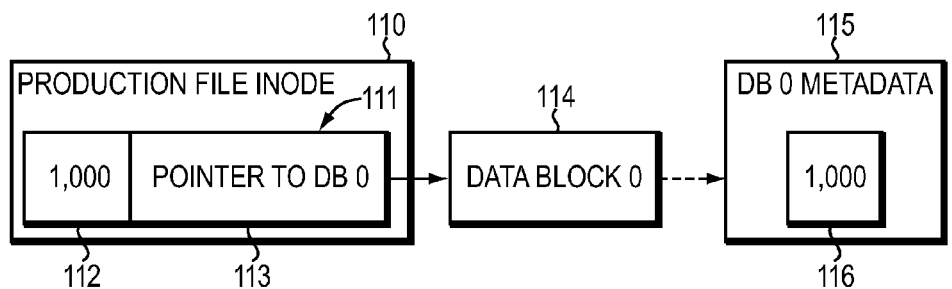

As shown in FIG. 9, for example, a production file inode 110 includes a mapping pointer field 111 containing a delegated reference count 112 and a block pointer 113 pointing to a first file system data block 114. The block pointer 114 is a file system block number of the first data block 114. The first data block 114 has associated per-block metadata 115 including a reference count 116. The per-block metadata 115 of the first data block 114, for example, is organized as table separate from the first data block 114 and indexed by the block number of the first data block 114.

In the example of FIG. 9, the delegated reference count 112 is associated with the parent-child block relationship indicated by the block pointer 113 by storing the delegated reference count in one or more bytes of the mapping block pointer field 111. The delegated reference count 112, however, could be associated with the parent-child block relationship in other ways. For example, the delegated reference count could be stored in a metadata table of the production file inode 110.

In the example of FIG. 9, the delegated reference count 112 has an initial full-weight value of 1,000, and the reference count 116 in the per-block metadata 115 of the first data block 114 also has an initial full-weight value of 1,000. In other words, the initial full-weight value of 1,000 should be understood as representing a full ownership interest (i.e., a 100% ownership interest) of the file system data block, corresponding to a value of one count in the conventional usage of a reference count in a data de-duplication facility. The snapshot copy facility delegates a partial ownership interest to a snapshot copy when sharing occurs between a snapshot copy and a production file. The data de-duplication facility increments the reference count in the per-block metadata by a full-weight value when the data de-duplication facility causes sharing of the data block to occur within the same file or between entirely unrelated files.

Figure 10:
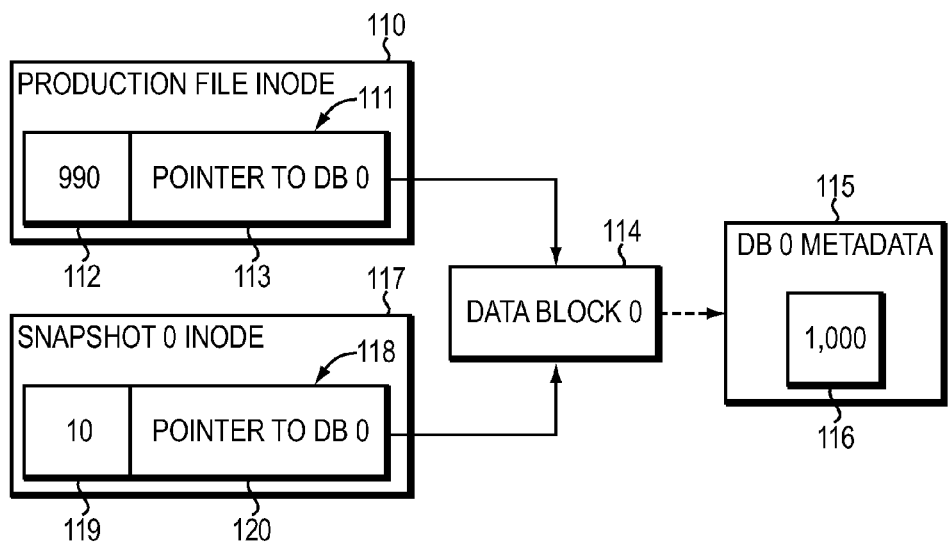

As shown in FIG. 10, when the snapshot copy facility creates a first snapshot copy of the production file, the snapshot copy facility allocates an inode 117 for the snapshot copy, and copies the content of the production file inode 110 into the snapshot copy inode 117. Then the snapshot copy facility decrements the delegated reference count 112 in the mapping block pointer field 111 of the production file inode 110 by a partial-weight value of 10, and sets the delegated reference count 119 in the mapping block pointer field 118 of the snapshot inode 117 to the same partial-weight value of 10. Block pointer 120 of the mapping pointer 118 in snapshot inode 117 of the snapshot copy of production file now points to the same file system data block 114 and thus indicates that file system data block 114 is shared by the production file and the snapshot copy of the production file.

Although in general a partial-weight value is simply smaller than a full-weight value, in most cases the ratio of the full-weight value to the partial-weight value may be greater than the maximum number of snapshot copies of a production file. For some applications, a relatively small partial weight in relationship to a limited number of snapshot copies would also permit identification of child blocks exclusively owned or shared only among snapshot files, permitting a rapid delete of all snapshot copies simply by scanning for file system blocks having a reference count value below a certain threshold, and de-allocating all such blocks.

Figure 11:
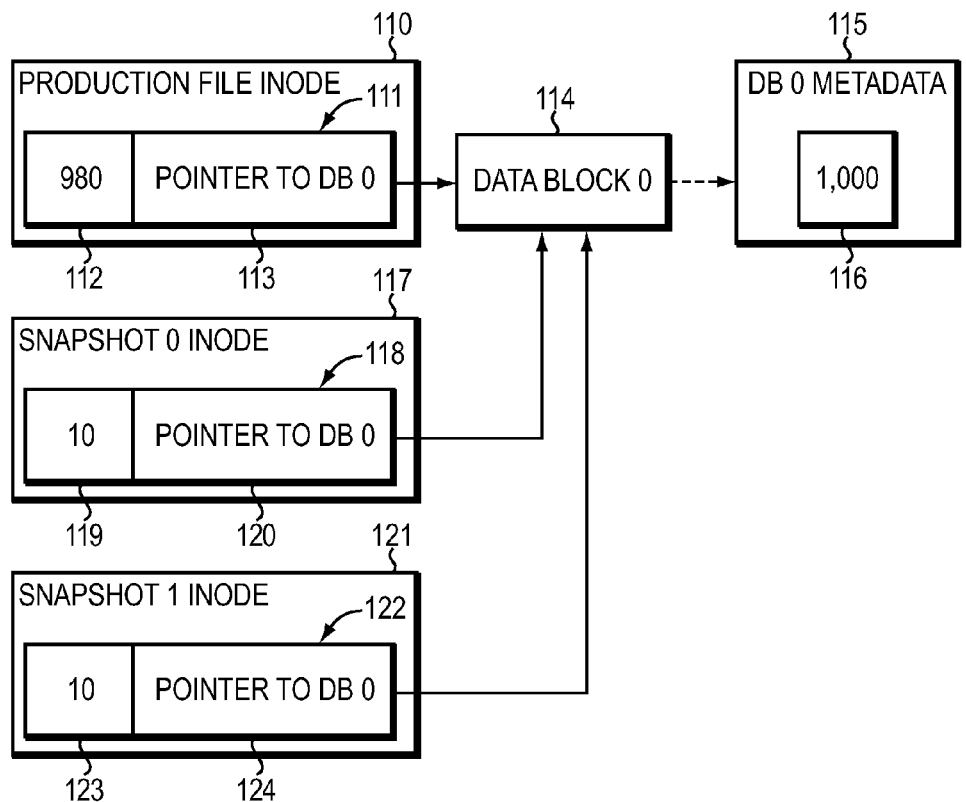

As shown in FIG. 11, when the snapshot copy facility creates a second snapshot copy of the production file, the snapshot copy facility allocates an inode 121 for the second snapshot copy, and copies the content of the production file inode 110 into the second snapshot copy inode 121. Then the snapshot copy facility decrements the delegated reference count 112 in the mapping block pointer field 111 of the production file inode 110 by a partial-weight value of 10, and sets the delegated reference count 123 in the mapping block pointer field 122 of the second snapshot inode 121 to the same partial-weight value of 10. Thus, block pointer 124 of the mapping pointer field 122 in the second snapshot copy of the production file now points to the same file system data block 114 and indicates that file system data block 114 is now shared by the production file, the first snapshot copy and the second snapshot copy.

Figure 12:
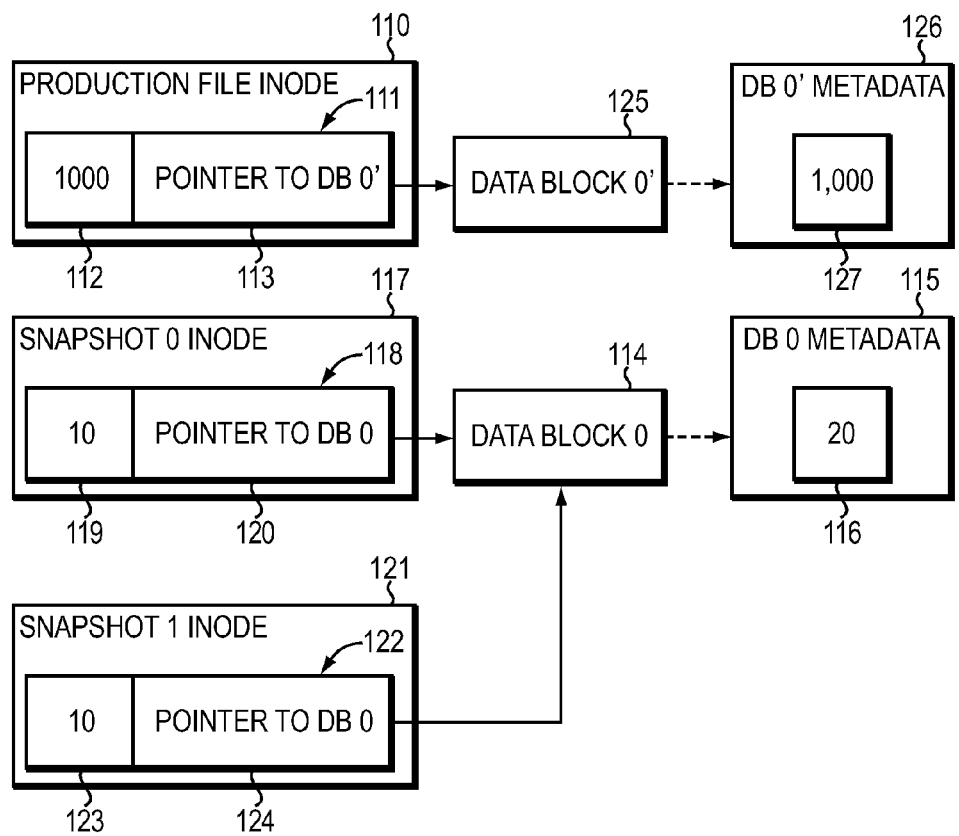

As shown in FIG. 12, with reference also to FIG. 11, when the snapshot copy facility writes to the first data block of the production file, it allocates a new data block 125 and writes to the new data block 125 and sets the reference count 127 in the per-block metadata 126 of the new data block 125 to a full-weight value of 1,000, and decrements the reference count 116 in the per-block metadata 115 of the old data block 114 by the delegated reference count 112 associated with the mapping pointer of the old data block 114 (resulting in a decremented reference count of 20), and changes the block pointer 113 to point to the new data block 125, and resets the delegated reference count 112 to a full-weight value of 1,000. Thus, file system data block 114 no longer remains shared between the production file and snapshot copies of the production file.

Figure 13:
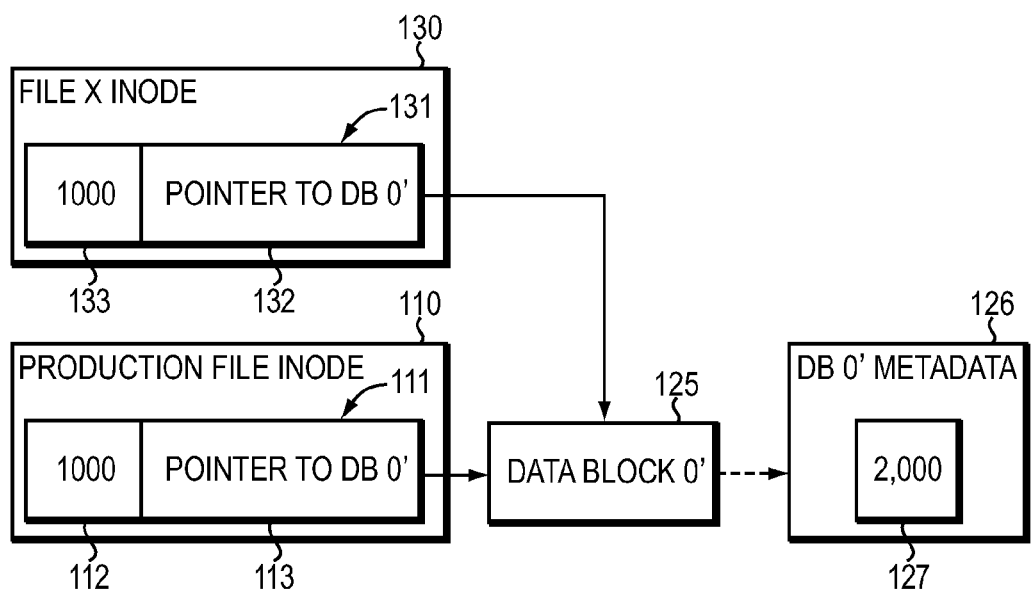

As shown in FIG. 13, when the data de-duplication facility finds that a file named "File X" includes a data block having the same content as the data block 125 of the production file, the data de-duplication facility deduplicates the data block by updating block pointer 132 in the inode 131 of the File X to point to the data block 125, and sets delegated reference count 133 in the mapping block pointer field 131 to indicate a full-weight value of 1,000, and increments the reference count 127 in the per-block metadata 126 of the data block 125 by the full-weight value. Thus, the reference count 127 has a value of 2,000.

In general, the delegated reference count mechanism as shown in FIGS. 9-13 results in the reference count in the per-block metadata of a child block of a file system being equal to the sum of all the delegated reference counts associated with all of the child's parent blocks in the file system block hierarchy of the file system. On the other hand, the block sharing caused by data de-duplication increments the reference count in the per-block metadata of a child block by a full weight. Whereas, the block sharing caused by creation of snapshot copies does not change the reference count in the per-block metadata of a child block, but the deletion of the production file or a snapshot copy will decrement the reference count in the per-block metadata of a child block by a full weight or a partial weight depending on whether or not the deleted version did not share the child block with a related version or did share the child block with a related version.

Figure 14:
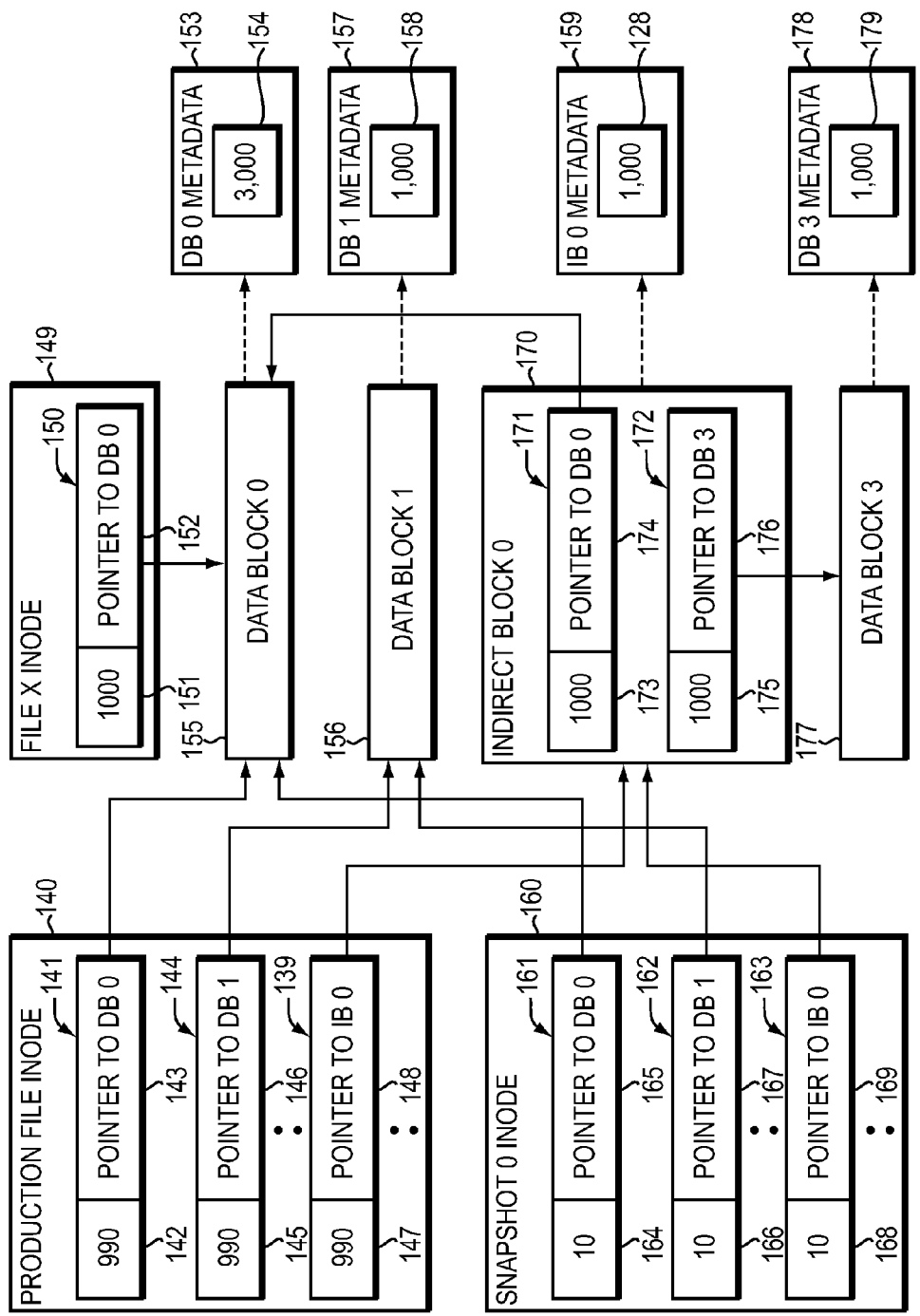

FIG. 14 shows an example of a more general case in which a production file includes an indirect block 170 in addition to the production file inode 140 and at least three file system data blocks 155, 156, and 177. A first mapping block pointer field 141 in the production file inode 140 includes a delegated reference count 112, and the block pointer field 143 to a first data block 155. The first data block 155 has per-block metadata 153 including a reference count 153. A second block pointer field 146 in the production file inode 140 includes a delegated reference count 145 and the block pointer field 146 pointing to a second data block 156. The second data block 156 has per-block metadata 157 including a reference count 158 having a full-weight value of 1,000. The production file inode 140 includes another mapping block pointer field 139 including a reference count 147 and the bock pointer field 148 pointing to an indirect block 170. The indirect block 170 has per-block metadata 159 including a reference count 128 having a full-weight value of 1,000. The indirect block 170 has a first mapping block pointer field 171 including a delegated reference count 173 having a full-weight value of 1,000, and the first block pointer field 174 pointing to the first data block 155 because the deduplication facility has found that the content of the data block pointed to by block pointer 174 is same as the contents of first data block 155. The indirect block 170 has a second mapping block pointer field 172 including a delegated reference count 175 having a full-weight value of 1,000, and the second block pointer field 176 pointing to a third data block 177. The third data block 177 has per-block metadata 178 including a reference count 179 having a full-weight value of 1,000.

A snapshot copy is made of the production file, an inode 160 is allocated for the snapshot copy, and content of the production file inode 140 is copied into the snapshot copy inode 160, so that the child blocks 170, 155, and 156 of the production file inode 140 also become child blocks of the snapshot copy inode 160. Then the delegated reference counts 142, 145, 147 in the production file inode 140 are each decremented by a partial-weight value of 10, and the delegated reference counts 164, 166, 168 in the snapshot copy inode 160 are set to the partial-weight value of 10.

Referring again to FIG. 14, the data de-duplication facility finds that the content of a data block in an otherwise unrelated file named "File X" is the same as the content of the first data block 155. The data de-duplication facility changes the block pointer 152 in the File X inode 149 to point to the first data block 155, and increments the reference count 154 in the per-block metadata 153 of the first data block 155 by 1,000, the full-weight value in the delegated reference count 151 in the mapping pointer field 150 in the File X inode 149.

Figure 15:
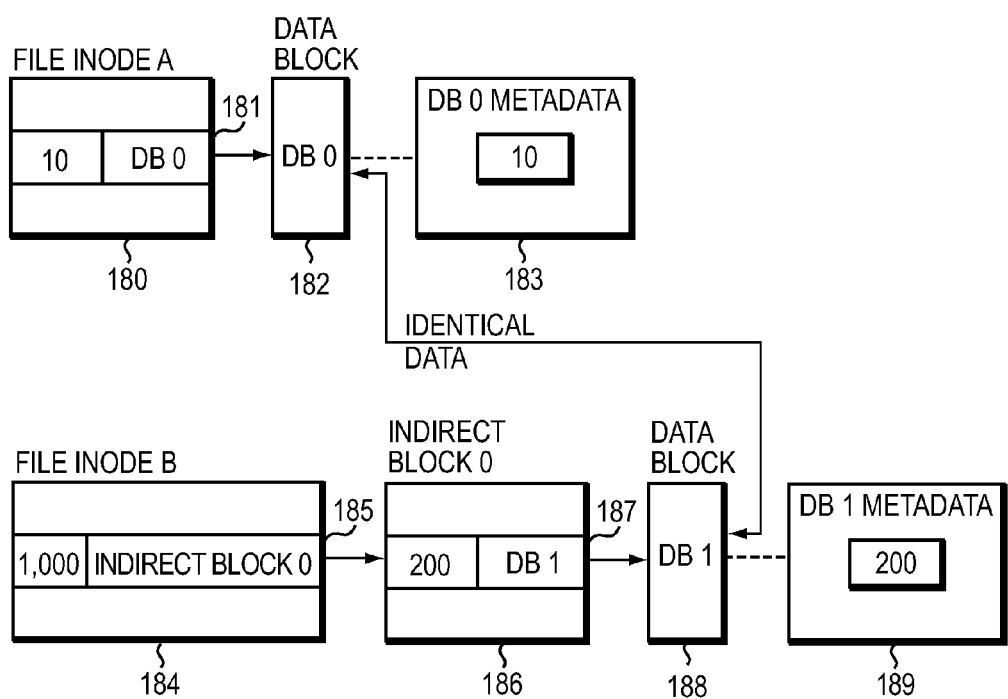

Referring to FIG. 15, shown is a mapping of data blocks of a file system before deduplication of data blocks that may be included in an embodiment using the techniques described herein. File inode A 180 represents metadata of a first file named "file A" in a file system. File inode B 184 represents metadata of a second file named "file B" in the file system. File inode A 180 includes a block pointer 181 that points to data block DB-0 182 of the first file. File inode B 184 includes an indirect block pointer 185 pointing to indirect block 186 that includes a block pointer 187 pointing to data block DB-1 188. With reference also to FIG. 4, when data source 20 sends an I/O request for the data block DB-1 188, digest is computed for the data block DB-1 or when the data block DB-1 188 is part of an iteration scheme, deduplication logic 22 computes a digest for the data block DB-1 188. Deduplication logic 22 then compares the digest of the data block DB-1 188 with list of digests stored in index table 26 and finds an index entry that contains a matching digest entry corresponding to data block DB 0 182. Deduplication logic 22 determines that the digest of the data block DB-1 is identical to the digest of the data block DB-0. Upon finding the matching digest entry, the data block DB-0 182 and the data block DB-0 188 can then be deduplicated.

Figure 16:
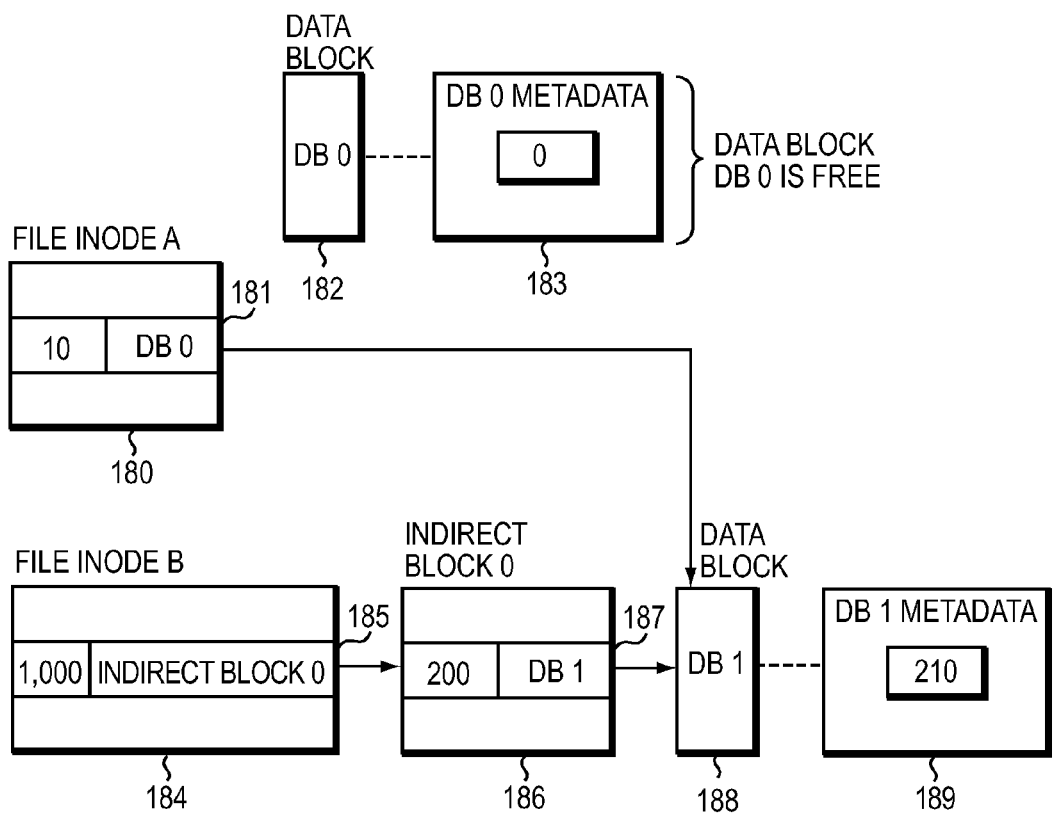

Referring to FIG. 16, shown is a mapping of data blocks of a file system after deduplication of data blocks that may be included in an embodiment using the techniques described herein. With reference also to FIGS. 4 and 15, if the matching digest entry is found in the index table 26 for the data block DB-1 188, the block mapping of the data block DB-0 182 is updated in order to deduplicate the data block DB-1 188. Block pointer 181 of file inode A 180 is updated to point to the data block DB-1 188 instead of the data block DB-0 182. The data block DB-0 182 is then freed up as an unused space. Also, reference count in per-block metadata 189 of data block DB-1 188 is incremented by a reference count value stored in per-block metadata 183 of data block DB-0 182. Additionally, the digest bit of the mapping pointer 187 for data block DB-1 188 is updated to indicate that the data block DB-1 188 has been digested. Further, the deduped bit of the BMD state of per-block metadata 189 of data block DB-1 188 is updated to indicate that the data block DB-1 188 has been deduplicated.

Figure 17:
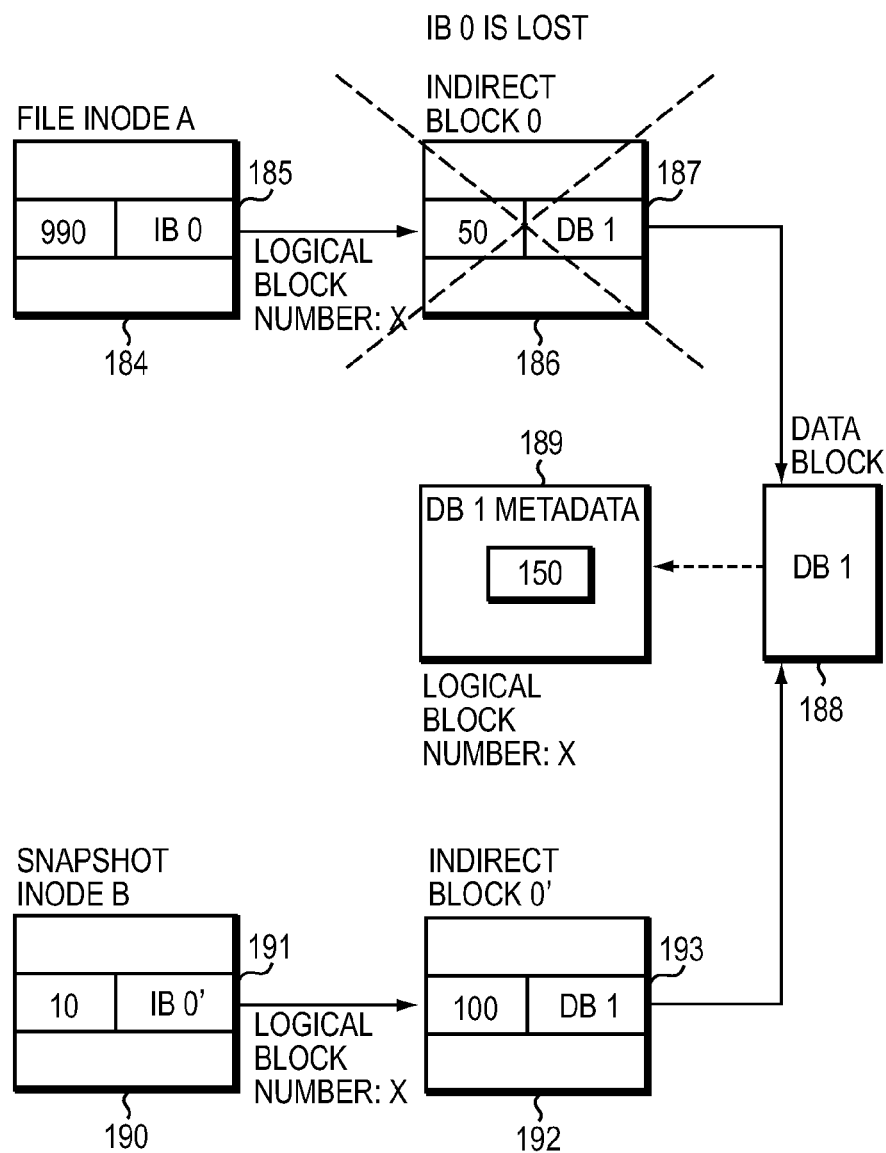

Referring to FIG. 17, shown is a mapping of data blocks of a file system when recovering a corrupted leaf indirect block that may be included in an embodiment using the techniques described herein. File inode B 184 of a file named "file B" includes mapping pointer 185 pointing to indirect block 186. Indirect block 186 includes mapping pointer 187 pointing to data block DB-1 188. The snapshot copy facility creates a replica of the file named "file B" by coping contents of file inode B 184 to snapshot inode B 190. Snapshot inode B 190 includes mapping pointer 191 pointing to indirect block 192 that is a copy of indirect block 186 of file inode B 184. Both indirect blocks 186, 192 points to the same data block DB-1 188. The per-block metadata 189 of data block DB-1 188 includes a reference count that is sum of delegated reference counts of indirect blocks 186, 192 of file inode B 184 and snapshot inode B 190 respectively. As described elsewhere herein, a file and a replica of the file share data blocks at same logical offsets. If indirect block 186 of file inode B 184 becomes corrupted and needs to be rebuild as part of a recovery of "file B", the FSCK utility may use information stored in per-block metadata 189 of data block DB-1 188 to rebuild indirect block 186. The FSCK utility rebuilds indirect block 186 by storing in indirect block 186 a mapping pointer that points to data block DB-1 188 at a logical offset value which is stored in per-block metadata 189 of the data block DB-1 188. Further, the FSCK utility sets the delegated reference count in mapping pointer 187 of indirect block 186 to 50 because indirect block 192 sharing data block DB-1 188 includes the delegated reference count equal to 100 and the per-block metadata 189 of the data block DB-1 188 includes the total delegated reference count as 150.

Figure 18:
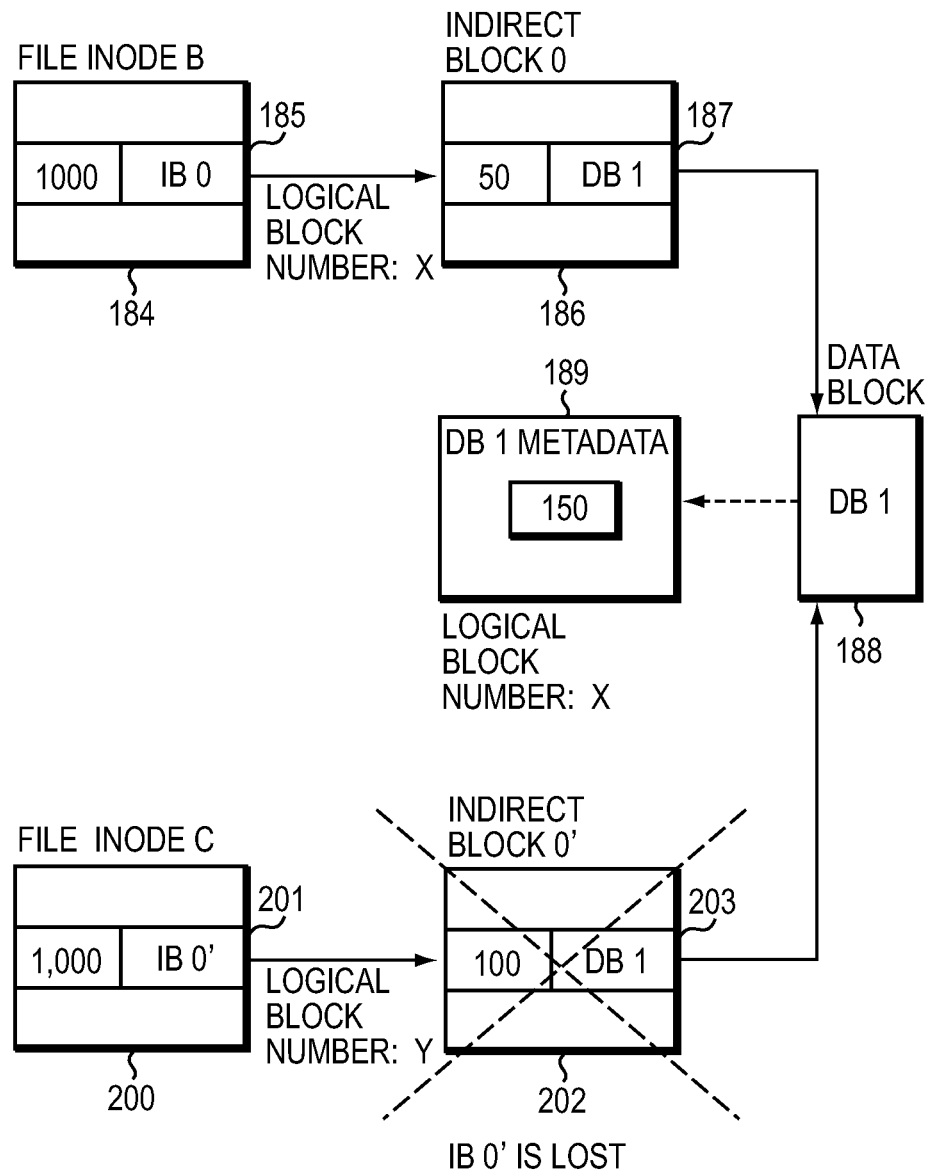

Referring to FIG. 18, shown is a mapping of data blocks of a file system when recovering a corrupted leaf indirect block that may be included in an embodiment using the techniques described herein. With reference also to FIG. 17, the data de-duplication facility finds that content of a data block in an otherwise unrelated file named "file C" is the same as content of the data block DB-1 188 pointed to by indirect block 186 of file inode B 184. The data de-duplication facility changes the block pointer 203 in the indirect block 202 of file inode C 200 to point to the data block DB-1 188, and increments the reference count in the per-block metadata 189 of the data block DB-1 188 by 100, the full-weight value in the delegated reference count field stored in the mapping pointer field of the indirect block 202 of the file inode C 200. In this example, the logical block offset of a data block of "file C" that has been deduplicated to data block DB-1 188 is different from the logical block offset of data block DB-1 188 of file B. As a result, if indirect block 202 becomes corrupted, the FSCK utility can not rebuild the indirect block 202 using the information stored in per-block metadata 189 of data block DB-1 188 because the FSCK utility may create a metadata inconsistency by using the logical offset stored in per-block metadata 189 of data block DB-1 188 which is different from the logical offset at which data block DB-1 188 is accessed by indirect block 202 of file C. In at least one embodiment of the current technique, the FSCK utility checks whether data block DB-1 188 has been deduplicated. If data block DB-1 188 has been deduplicated, the FSCK utility does not recover a block pointer in indirect block 202 that points to data block DB-1 188 and instead proceeds to recover other block pointers (not shown) that points to data blocks which are not deduplicated.

Figure 19:
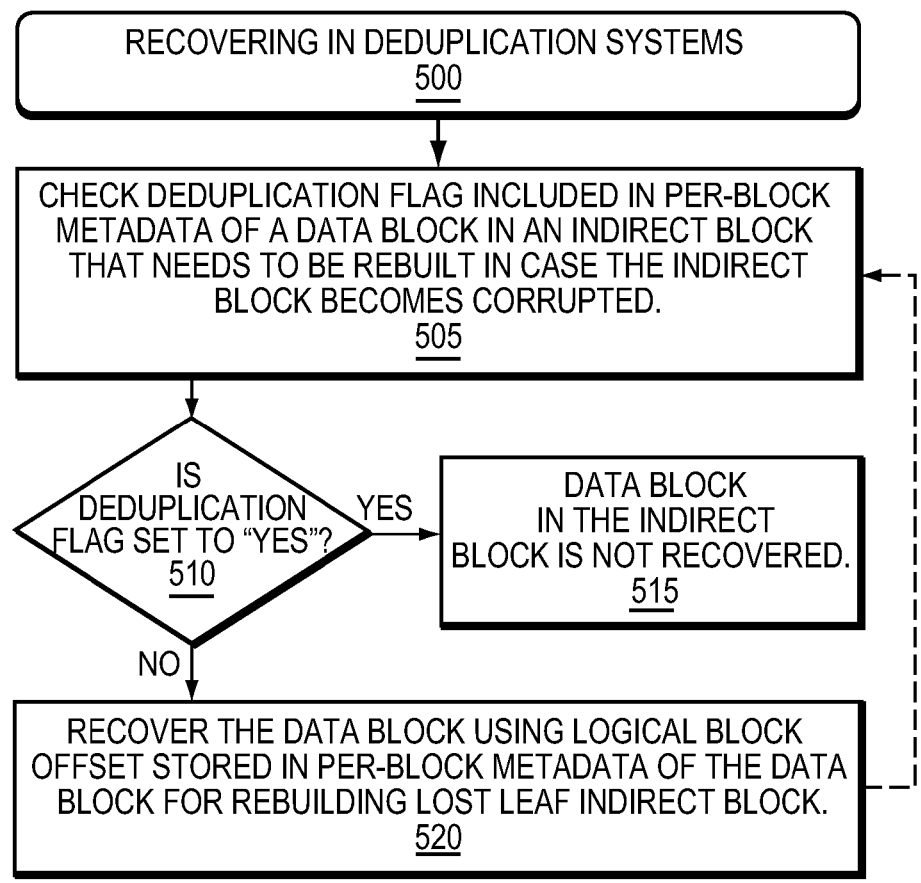
FIGS. 19-21 are flow diagrams illustrating processes that may be used in connection with techniques herein.

Referring to FIG. 19, shown is a flow diagram illustrating a flow of data in the data storage system. With reference also to FIGS. 4 and 6-8, the file system checking (FSCK) utility starts processing of a file system to verify integrity of the file system and to optionally repair the file system on finding inconsistency in metadata of the file system in deduplication systems (step 500). The FSCK utility recovers each leaf indirect block stored in the inode or indirect blocks of the file system. A leaf indirect block includes mapping pointers pointing to data blocks of the file system. Some of the data blocks pointed to by the leaf indirect pointer may be deduplicated. For each mapping pointer included in a leaf indirect block pointer, the FSCK utility checks the deduped bit stored in the per-block metadata of a data block pointed to by each mapping pointer included in the leaf indirect block (step 505). If a value stored in the deduped bit included in the per-block metadata of a data block indicates that the data block has been deduplicated (step 510), the FSCK utility skips the data block and does not recover the mapping pointer for the data block (step 515). If a value stored in the deduped bit included in the per-block metadata of the data block indicates that the data block has not been deduplicated (step 510), the data block is recovered using the logical block offset stored in the per-block metadata of the data block (step 520). In at least one embodiment, if an inode of a file or a leaf indirect block of the file is not corrupted, the FSCK utility does not skip the deduplicated data block pointed to by the mapping pointer included in the inode or the leaf indirect block of the file. However, if the inode of the file or the leaf indirect block of the file is corrupted, the FSCK utility can not recover the deduplicated data block pointed to by the mapping pointer included in the inode or the leaf indirect block of the file because the FSCK utility cannot use the logical offset value stored in the per-block metadata of the deduplicated data block.

Figure 20:
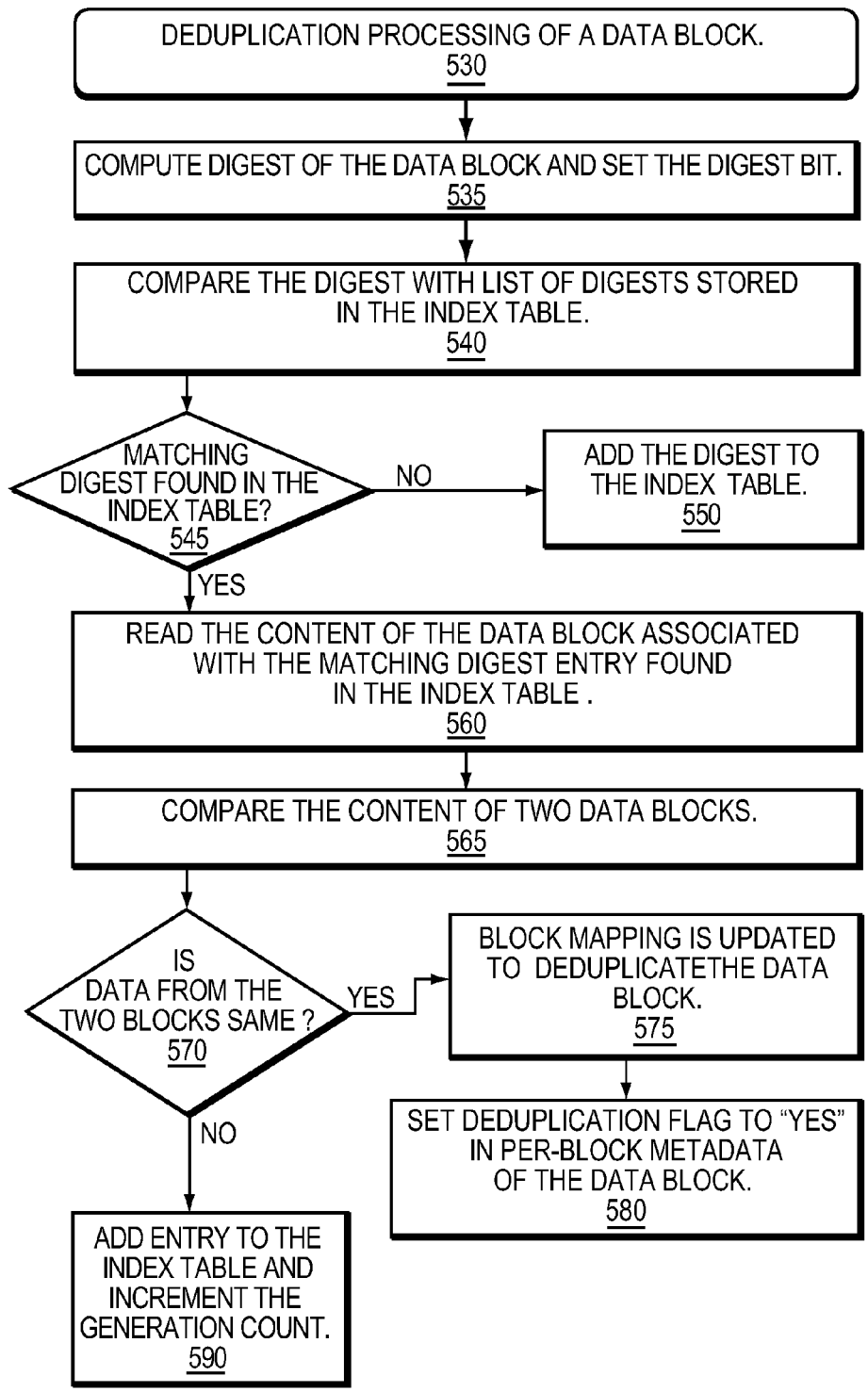

Referring now to FIG. 20 that illustrates a process of deduplicating two data blocks that have been identified by deduplication logic 22 as duplicate data blocks during processing of a digest information (step 530). With reference also to FIGS. 4 and 6-8, deduplication logic 22 computes a digest of a data block (referred below as "first data block") and the digest bit stored in the mapping pointer of the data block is updated to indicate that the data block has been digested (step 535). Deduplication logic 22 then compares the digest information of the first data block with the list of digests stored in the index table 26 (step 540). A matching digest found in the index table 26 indicates that the first data block contains exact same data as data stored in a second data block corresponding to the matching digest (step 545). Deduplication logic 22 issues a request to the deduplication server 38 to deduplicate the first data block and the second data block. Deduplication server 38 extracts filesystem information for the first data block from file system mapping driver 36 and extracts filesystem information for the second data block from the deduplication key associated with the matching digest found in the index table. Deduplication server 38 issues an I/O request to the IO Coordinator 35. The IO Coordinator 35 issues a mapping request to the file system mapping driver 36 to find a physical address of the first data block. If the mapping request completes successfully, the IO Coordinator 35 reads the data from the first data block located at the physical address indicated by the mapping. The deduplication server 38 issues a read request for the second data block. The read request for the second data block is processed identically to the first read request (step 560). Deduplication server 38 compares the data read from the first data block with the data read from the second data block (step 565). If the data of the first data block is not same as the data of the second data block, an entry is added to the index table and a generation count for the data block included in the index table 26 is incremented (step 590). If the data of the first data block is same as the data of the second data block, the IO Coordinator 35 requests deduplication server 38 to deduplicate the two identical data blocks by updating address mapping of data blocks. If the data blocks are successfully deduplicated, the address mapping of the first data block is updated to point to a single copy of the data (i.e., the address map of the first data block now points to the address map of the second data block) (step 575). Then, the deduped bit stored in the per-block metadata of the deduplicated data block is updated to indicate that the data block has been deduplicated (step 580). If no matching digest is found in the index table, the digest of the first data block is added to the index table (step 550).

Figure 21:
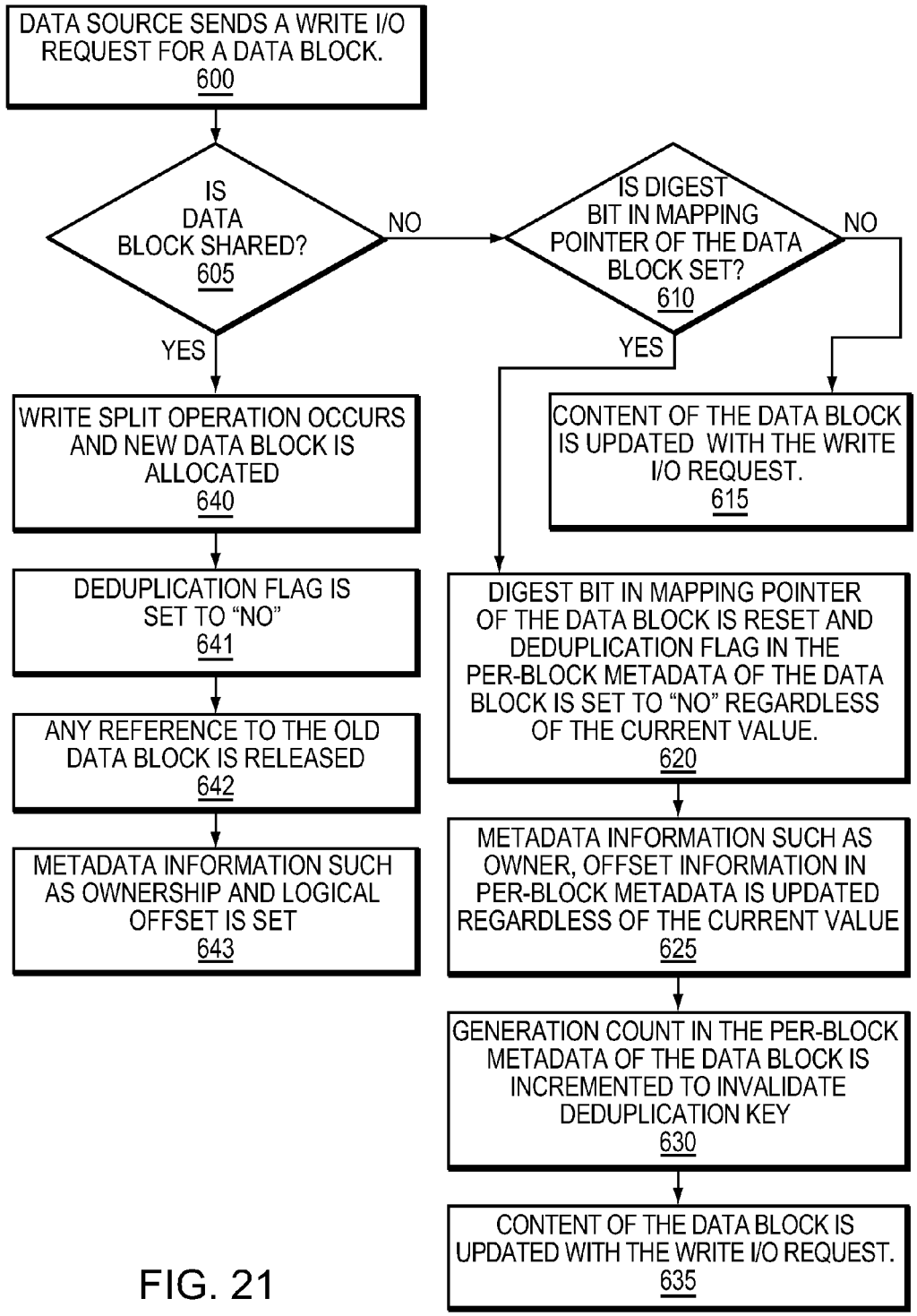

Referring to FIG. 21, shown is a more detailed flow diagram illustrating a flow of data in the data storage system. With reference also to FIGS. 4 and 6-8, data source 20 sends a write I/O request for a data block where the write request for the data block includes an offset of the data block (step 600). The shared bit stored in the mapping pointer for the data block is evaluated to check whether the data block has been shared after application of the deduplication facility and/or the snapshot copy facility. If the shared bit indicates that the data block has been shared among versions of a file or unrelated files by a sharing relationship (step 605), a write split operation occurs. The write split operation breaks the sharing relationship of the data block and allocates a new data block for the write I/O request (step 640). If the mapping pointer that points to the data block resides in a shared indirect block, the sharing relationship of the indirect block is also broken. In such a case, in at least one embodiment of the current technique, the write split operation causes a new indirect block to be allocated and mapping pointers for all data blocks not involved in the write operation are copied to the new indirect block. The process of copying mapping pointers to the new indirect block includes distributing the delegated reference count values of mapping pointers between the original shared indirect block and the newly allocated indirect block. In addition to the distribution of the delegated reference count values, the shared bits of the copied mapping pointers are updated to indicate that the sharing relationship has been broken. Further, the deduped bit stored in the per-block metadata of the data block is updated to indicate that the data block has been reduplicated and is no longer a deduplicated data block (step 641). Any reference to the old data block is released and the mapping pointer of the new data block is updated to point to the newly allocated data block (step 642). Further metadata information such as ownership and logical offset in the per-block metadata of the data block is updated (step 643).

If the shared bit of the data block indicates that the data block has not been shared among versions of a file or unrelated files by a sharing relationship (step 605), the digest bit in the mapping pointer for the data block is checked (step 610). If the digest bit in the mapping pointer for the data block indicates that the data block has not been digested, contents of the data block are updated according to the write I/O request and the write I/O requests completes (step 615).

If the digest bit in the mapping pointer for the data block indicates that the data block has been digested as part of deduplication processing, the digest bit in the mapping pointer for the data block is reset and the deduped bit stored in the per-block metadata of the data block is updated to indicate that the data block is no longer deduplicated (step 620). Further metadata information such as ownership and logical offset in the per-block metadata of the data block is updated (step 625). A generation count value stored in the per-block metadata of the data block is incremented indicating that the deduplication key associated with the data block is no longer valid (step 630). Contents of the data block are updated according to the write I/O request and the write I/O requests completes (step 635).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in recovering in deduplication systems, the method comprising:
    evaluating a per-block metadata of a data object for determining deduplication status for the data object;
    based on the deduplication status, skip recovering the data object if the data object is deduplicated, wherein first and second files refer to the deduplicated data object; and
    based on the deduplication status, recovering the data object using information included in the per-block metadata of the data object, wherein the information included in the per-block metadata indicates sharing of the data object between a file and a snapshot copy of the file.

2. The method of claim 1, further comprising updating deduplication status for the data object.

3. The method of claim 1, wherein the data object is selected from the group consisting of a deduplication domain, a storage extent, a LUN, a file and a data block, wherein the data block is a fixed size chunk of a physical disk storage.

4. The method of claim 3, wherein the deduplication domain comprises a set of storage extents, wherein each storage extent of the set of storage extents comprises a set of LUNs, each LUN of the set of LUNs is a logical representation of a subset of a physical disk storage.

5. The method of claim 1, wherein a digest is associated with the data object, wherein the digest is based on contents of the data object and uniquely identifies the data object.

6. The method of claim 1, wherein metadata of the data object includes information indicating whether the data object is associated with a digest, wherein the information includes a digest bit.

7. The method of claim 1, wherein metadata of the data object includes information indicating whether the data object is deduplicated, wherein the information includes a deduplication flag.

8. The method of claim 1, further comprising:
    receiving a request to deduplicate the data object;
    updating a digest bit stored in metadata of the data object indicating the data object is digested;
    updating a deduplication flag stored in metadata of the data object indicating the data object is deduplicated; and
    deduplicating the data object, wherein deduplicating the data object comprises updating an address mapping of the data object to point to another data object, wherein the data object and said another data object contain same content of data, the address mapping indicating a location of the data object on a disk storage, and deleting the content of the data object from the disk storage.

9. The method of claim 1, further comprising:
    evaluating a deduplication flag stored in metadata of the data object;
    determining, based on information in the deduplication flag, whether the data object is deduplicated; and
    based on the determination, recovering the data object using a logical offset included in metadata of the data object.

10. The method of claim 1, further comprising:
    upon receiving a request to write data to the data object, determining a sharing status for the data object;
    determining, based on whether the data object is shared, whether to allocate a new data object for writing data;
    determining, based on whether the new data object is allocated, whether to update a deduplication flag indicating the data object is no longer deduplicated; and
    determining, based on whether the data object is associated with a digest, whether to update a digest bit indicating the data object is no longer digested.

11. A system for use in recovering in deduplication systems, the system comprising:
    a processor:
    first logic evaluating a per-block metadata of a data object on a data storage system for determining deduplication status for the data object;
    second logic skip recovering, based on the deduplication status, the data object if the data object is deduplicated on the data storage system, wherein first and second files refer to the deduplicated data object; and
    third logic recovering, based on the deduplication status, the data object using information included in the per-block metadata of the data object, wherein the information included in the per-block metadata indicates sharing of the data object between a file and a snapshot copy of the file.

12. The system of claim 11, further comprising:
    fourth logic updating deduplication status for the data object.

13. The system of claim 11, wherein the data object is selected from the group consisting of a deduplication domain, a storage extent, a LUN, a file and a data block, wherein the data block is a fixed size chunk of a physical disk storage.

14. The system of claim 13, wherein the deduplication domain comprises a set of storage extents, wherein each storage extent of the set of storage extents comprises a set of LUNs, each LUN of the set of LUNs is a logical representation of a subset of a physical disk storage.

15. The system of claim 11, wherein a digest is associated with the data object, wherein the digest is based on contents of the data object and uniquely identifies the data object.

16. The system of claim 11, wherein metadata of the data object includes information indicating whether the data object is associated with a digest, wherein the information includes a digest bit.

17. The system of claim 11, wherein metadata of the data object includes information indicating whether the data object is deduplicated, wherein the information includes a deduplication flag.

18. The system of claim 11, further comprising:
    fourth logic receiving a request to deduplicate the data object;
    fifth logic updating a digest bit stored in metadata of the data object indicating the data object is digested;
    sixth logic updating a deduplication flag stored in metadata of the data object indicating the data object is deduplicated; and
    seventh logic deduplicating the data object, wherein deduplicating the data object comprises updating an address mapping of the data object to point to another data object, wherein the data object and said another data object contain same content of data, the address mapping indicating a location of the data object on a disk storage, and deleting the content of the data object from the disk storage.

19. The system of claim 11, further comprising:

fourth logic evaluating a deduplication flag stored in metadata of the data object;

fifth logic determining, based on information in the deduplication flag, whether the data object is deduplicated; and sixth logic recovering, based on the determination, the data object using a logical offset included in metadata of the data object.

20. The system of claim 11, further comprising:

fourth logic upon receiving a request to write data to the data object, determining a sharing status for the data object;

fifth logic determining, based on whether the data object is shared, whether to allocate a new data object for writing data;

sixth logic determining, based on whether the new data object is allocated, whether to update a deduplication flag indicating the data object is no longer deduplicated; and seventh logic determining, based on whether the data object is associated with a digest, whether to update a digest bit indicating the data object is no longer digested.

* * * * *